UNITED STATES PATENT OFFICE.

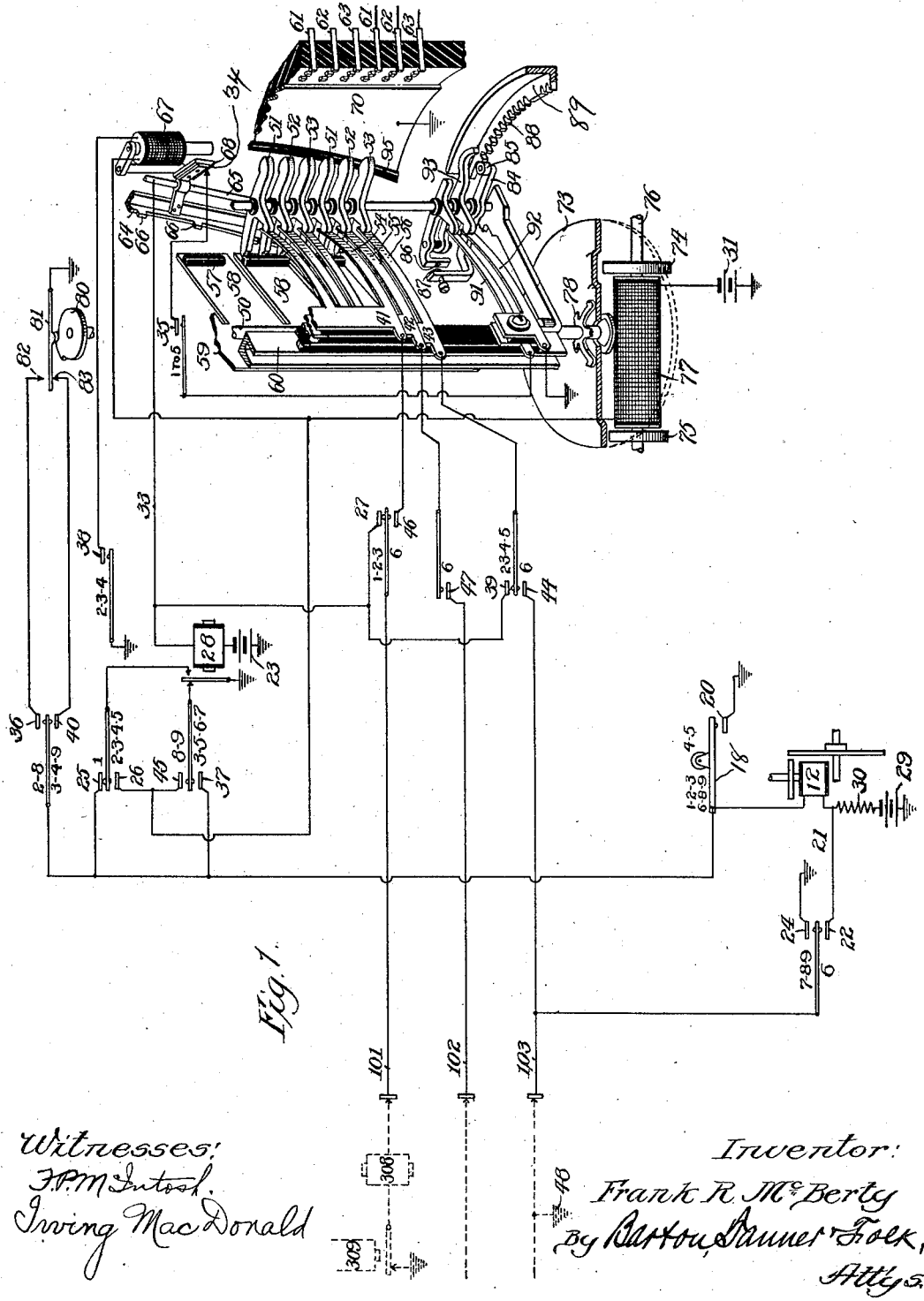

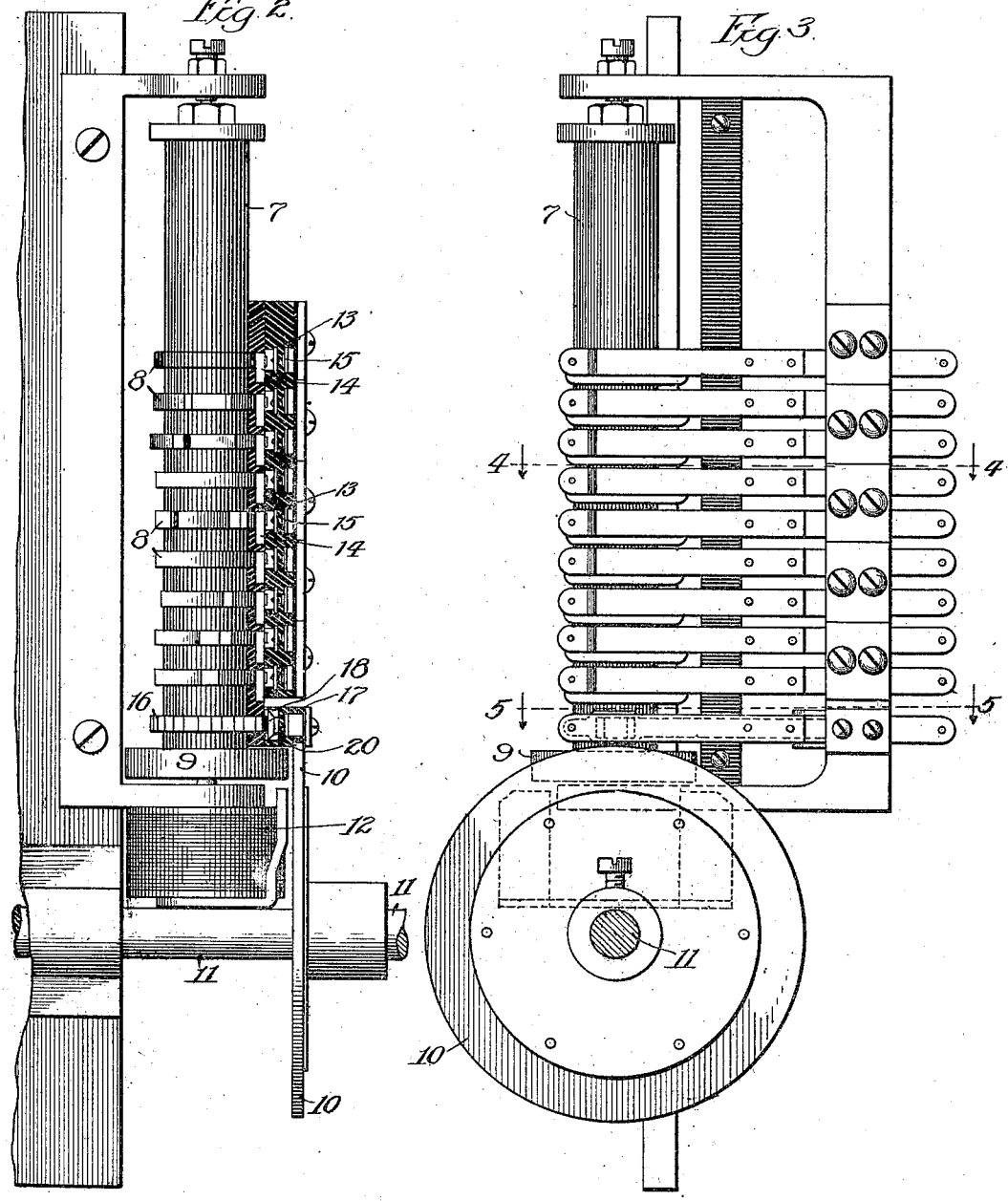

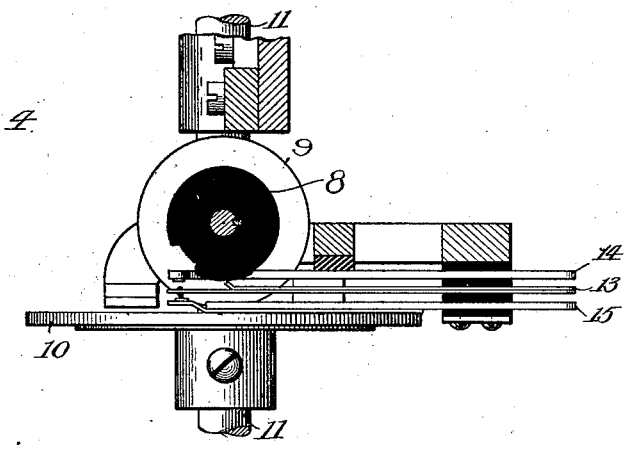
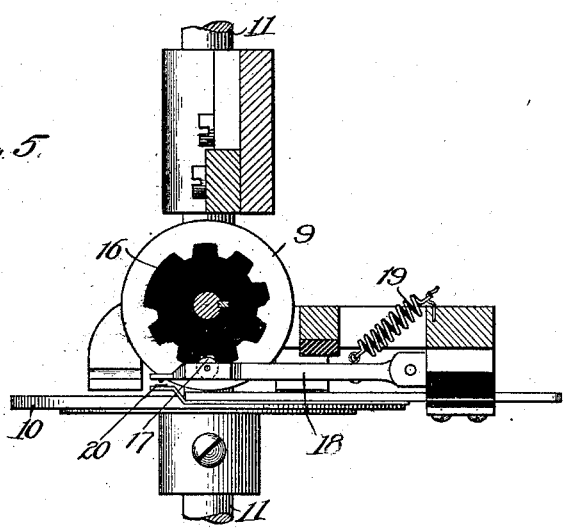

FRANK R. McBERTY, OF NEW ROCHELLE, NEW YORK, ASSIGNOR TO WESTERN ELECTRIC COMPANY, OF CHICAGO, ILLINOIS, A CORPORATION OF ILLINOIS.

AUTOMATIC SWITCHING APPARATUS.

1,009,080.     Specification of Letters Patent.     Patented Nov. 21, 1911.

Application filed September 11, 1908. Serial No. 452,539.

*To all whom it may concern:*

Be it known that I, FRANK R. McBERTY, citizen of the United States, residing at New Rochelle, in the county of Westchester and State of New York, have invented a certain new and useful Improvement in Automatic Switching Apparatus, of which the following is a full, clear, concise, and exact description.

This invention relates to automatic switching apparatus and its object is to provide improved electrical means for automatically controlling a series of different operations—either of the same device or of different devices—in a definite and predetermined sequence.

The invention will be applicable to the control of electrical apparatus of various kinds. It will be of especial advantage, for example, in connection with an automatic telephone exchange system. In such a system the various operations of the different parts are all more or less inter-related. Some of them are intended to result from definite acts of the subscriber or of the operators (where operators are employed for supervisory purposes); some are dependent upon the existence of conditions which may vary from time to time; some must always occur in the same sequence; others may occur in a varied sequence, or may be omitted altogether, and the system as a whole must operate with speed and certainty under all the difficult and varying conditions met with in practice.

The present invention provides a very simple means of bringing about any desired sequence of electrical operations while permitting any desired degree of external or independent control.

For purposes of illustration the invention may be considered as applied to the control of an automatic selector switch. Such a device is broadly typical of a large class of automatic electrical mechanisms which may be controlled in accordance with this invention, as will be readily apparent.

The selector or other device to be controlled is associated with an auxiliary apparatus which I term a "sequence switch" adapted to establish in a definite order the various circuits required to make operative the different elements of the selector or other mechanism. The various devices or parts which are successively brought into action by the sequence switch exercise a reciprocal control over the motor mechanism of said sequence switch so that, for example, as each element finishes its work, it will cause an operation of the sequence switch to bring another device into action, and so on.

One feature of the invention involves the provision of local reciprocal controlling circuits progressively established by the sequence switch and by the device or devices under control such that when a normal operation of either is started, a complete cycle of operations will result, terminating in an automatic return of the various elements to normal condition. This cycle of operations may be controlled and checked at different stages and governed by various external agencies. But an especial advantage of the present invention is that a selector or other device may be prevented from becoming permanently displaced or "stalled" in an off-normal position by an accidental failure of current in any of the main circuits, since the apparatus is preferably so organized that the completion of the cycle of operations terminating in a return to normal must be positively checked in response to a flow of current in the main circuit. The circuits for carrying the sequence switch and the associated device under its control through a complete cycle of operations when once started may be purely local so as not to be subject to external disturbing conditions. The accuracy of selecting operations is assured by so organizing the apparatus that no selecting operation can be started unless the selector and its controlling switch mechanism are both in normal condition. Also in the case of a selector, the control by a sequence switch in accordance with this invention provides a very simple and efficient means for performing the various incidental operations which are essentially independent of control from the distant sending or transmitting point, such as the testing in rotation of a number of sets of trunk line terminals, making connection with the first set of terminals representing a line which is idle, making the other terminals of such line test "busy" to other selectors, establishing telephone transmission circuits, independent of the controlling or operating magnets of the selector, as well as making provision for the application of a local source of power to return the selector to normal position when released.

The sequence switch preferably consists of a series of contact springs adapted to be shifted by cams or other operating means carried upon a rotary shaft which is arranged to be driven by a source of mechanical power applied through the agency of an electromagnetic clutch. Any desired combination of circuits can thus be established in sequence as the rotary element is advanced step by step through different positions. The clutch magnet of the sequence switch may be successively brought, through the action of contacts established by the switch itself, under control of different circuits. These circuits may in turn be controlled by switches actuated in the operation of the various devices which are successively brought into action; or the apparatus may be similarly brought under the control of a switch at a distant point at any stage in the cycle of operations.

In order to continue the movement of the sequence switch from each position to the next after the initial energizing circuit of the clutch magnet is broken as the switch starts to move, an independent local circuit for said clutch magnet may be established through contacts which are closed by a special cam or actuating member while the rotary element is in transit from each of its intended stopping positions to the next, these contacts being opened as each stopping position is reached.

The continued movement of the sequence switch may in some instances be under the immediate control of a relay which in its operation closes alternate paths of the local circuit of the sequence switch clutch magnet through alternate contacts of its armature.

The invention will be more particularly explained and further features thereof set forth by reference to the accompanying drawings, in which—

Figure 1 is a diagram illustrating a selector and its associated local controlling apparatus and circuits; Fig. 2 is a view in elevation of one form of sequence-switch for controlling the local operating circuits of the selector; Fig. 3 is a side view of the sequence-switch; Fig. 4 is a sectional plan view thereof on line 4—4 of Fig. 3; Fig. 5 is a sectional plan view on line 5—5 of Fig. 3.

The same reference characters are used to designate the same parts wherever shown.

In the form of automatic selector which is chosen for the purpose of illustrating my invention, the switch carriage is provided with a number of multiple sets of brushes, any particular set of which may be selected for service, and the switch-carriage then advanced over a series of sets of line terminals until the selected brushes reach and make connection with a desired line. In the particular apparatus in question, the only selective action to be controlled from a distant sender is the choosing of a particular set of brushes, the advance of these brushes over the sets of line terminals in their path being a locally-controlled "hunting" action in which the sets of terminals are tested in rotation and the brushes brought to rest upon the first set which is idle. Certain features of this invention will be applicable, however, to selectors in which more than one purely selective action takes place under the control of a distant sender—that is, for example, first the selection of a group of lines, as by bringing into service a particular set of brushes serving that group, and then the selection of a particular line in that group, as by the advance of the selected brushes, under control from the distant sender, direct to the terminals of such desired line.

To describe in detail the mechanism of the particular selector shown, the switch carriage or brush-carrying member is of the rotary type, the frame 60 being mounted upon a vertical rotary shaft 50. At the outer end of the frame a number of contact brushes 51, 52, 53, are mounted in position to sweep over sets of line terminals 61, 62, 63, which are fixed in an insulating frame concentric with the shaft. The contact brushes are pivotally mounted so that their free ends may be rocked outwardly into position to engage the ends of the line terminals which they pass over, or rocked inwardly so that they will not contact with such terminals. Spring tongues 54, 55, 56, extending from insulated metal plates 41, 42, 43, respectively, press against projecting arms of the brushes, and besides making electrical connection therewith, tend to rock the brushes on their pivots in a direction to throw their forward or contact ends outwardly. The brushes are electrically connected in sets of three, and each set is normally latched against the thrust of the spring tongues 54, 55, 56, by a catch 57 which is normally held in the path of movement of the rear ends of said brushes. As shown, the catches 57 are insulating bars mounted on spring latch-arms 58, which are the free ends or tongues of a spring metal plate 59 fixed to the rotary frame 60. In order to bring any set of brushes into position to engage the contacts over which they travel, they must be released by tripping the corresponding catch 57 to allow the brushes to be rocked upon their pivots by their springs 54, 55, 56. This tripping of the brushes is accomplished by a trip-bar 64 which is pivotally mounted on an axis 65 and has at its edge a series of projecting lugs 66 in position to be moved into the paths of the respective latch-arms 58 when the trip-bar is rocked on its axis.

It is intended that only one of the several sets of brushes shall be selected and tripped in a given operation, and the trip-bar is therefore inclined at an angle so that the tripping lugs will face positions successively reached in the rotation of the brush-carrier frame. The trip-bar will be actuated to thrust forward its tripping lugs only for a moment when the end of the latch arm controlling the desired set of brushes reaches an angular position just in advance of that occupied by the particular lug which is at the proper height to engage that arm. The movement of the trip-bar may be accomplished by a tripping-magnet 67, the movable armature 68 whereof is mechanically connected to said bar.

A segmental metallic plate 70 is mounted in position to be engaged by the contact ends of the brushes as they are tripped, this plate extending to the end of the " trip range "— that is, through the arc traversed by the brushes as one set after another through the series is brought into position to be tripped. At the end of the trip range the bank of line terminals 61, 62, 63, begins. These terminals are arranged in sets of three, corresponding in relative positions to the relative positions of the brushes by which they are to be traversed, and the different sets are arranged in an arc in position to be successively reached in a point-to-point rotary advance of the brushes.

To restore the brushes to their latched position when the selector returns to normal, an insulating bar 95 is arranged to be passed over by the brushes in their return journey, the brushes in passing over this bar being raised thereby against the tension of their springs, until their beveled rear ends slip over the catches 57.

The motor mechanism for rotating the brush carrier frame may be as follows: A circular iron plate 73 is mounted to rotate with the shaft 50, but in such manner that it may be given a flatwise or tilting movement into engagement with one or the other of two iron friction-driving rollers 74, 75, which are located on either side of its axis, said rollers being mounted upon a constantly-driven power-shaft 76. An electromagnet 77, which I term the clutch magnet or power-magnet, is arranged to magnetize the driving rollers 74 and 75 to cause them to attract the iron plate 73. Said plate is provided with cam surfaces, so that in the normal position of the apparatus the under surface of said plate at one side of its axis 50 will be closer to the driving wheel 75 than the surface on the other side of said axis is to the driving wheel 74. Normally, therefore, when the power-magnet is excited the plate 73 will be drawn into engagement with roller 75 to receive motion therefrom, and the carrier shaft 50 will be rotated in a direction to advance the brushes. After the brushes have been advanced the distance required, the power-magnet will be deënergized, the plate 73 will be released from its engagement with driving roller 75, and said plate will recover from its tilted position by the action of a spring washer 78. The cam surface of the plate being now angularly displaced from the axis of the driving rollers, the body portion of the plate will be nearer to the "return" roller 74 which is of larger diameter than the roller 75, so that when the power-magnet is again energized the plate will be engaged by roller 74, and the shaft 50 will be rotated thereby in a direction to return the rotary carrier to normal position.

A cam 80 is carried by the rotary element of the selector to operate a switch. On the first rotary movement, and while the brushes are passing the trip range, the cam forces a contact spring 81 against an anvil 82, and at the end of the trip range the cam allows the spring 81 to recede from contact 82 and engage the alternate anvil 83.

A make-and-break contact device or interrupter is also arranged to be operated as the brush-carrier of the selector rotates. As shown, an interrupter arm 84 is pivoted in the carrier-frame similarly to the brushes 51, 52, 53, and carries at its forward end a roller 85 which is adapted to travel over a toothed segment 88, the arm being thereby caused to vibrate. As the roller rides up on each tooth, it rocks the arm 84 in a direction to close a contact 86, 87, and this contact remains closed until the roller has passed over the tooth and has nearly reached the bottom of the following notch. A spring tongue 91 which is mounted upon but insulated from the frame 60, presses against and makes continuous electrical connection with the contact arm 86. A pivoted arm 93, the foot of which rides upon the smooth rim of the toothed segment 88, has a rearward extension which engages an insulating stud carried by the arm 86, to hold said arm against the tension of the tongue 91. By this construction the relative positions of the contacts 86 and 87 in any position of the brush carrier frame depend solely upon the relative distance of the roller 85 from the rim of the toothed segment upon the edge of which it rides, and are independent of slight variations in the radial distance between said toothed segment and the axis of rotation of the brush-carrier frame. The making and breaking of contacts 86 and 87 as the brush-carrier frame rotates, is thus accurately regulated according to the cutting of the notches in the segment 88. A spring tongue 92, mounted upon but insulated from the brush-carrier frame, and also insulated from tongue 91, bears upon the arm 93, and serves to make electrical connection to the contact point 87, through said arm 93, the rim of the metallic segment 88 upon which it rides, the roller 85 riding upon the edge of said segment, and arm 84 carrying said contact point. The terminal wires of the circuit to be interrupted by said contact 86, 87, are therefore soldered or otherwise connected to the tongues 91 and 92 respectively.

The brushes 51, 52, 53, are electrically connected in multiple sets by the terminal plates 41, 42, 43, the plate 41 having tongues 54 making contact with all the brushes 51, the plate 42 having tongues making contact with all the brushes 52, and plate 43 having tongues 56 making contact with all the brushes 53. The two line wires and the test wire of the circuit leading to the selector may be soldered or otherwise permanently connected to the plates 41, 42 and 43, respectively. These three circuit wires may thus be electrically connected to any set of three stationary terminals 61, 62, 63, in any horizontal level, by first tripping the multiple set of brushes which travels over the required level, and then causing the brush-carrier to rotate until the selected brushes reach the desired set of terminals in that level.

There may be as many sets of brushes (within reasonable limits) as desired, and as many line terminals as desired in each level. The particular selector shown will have, for example, ten sets of brushes, and say twenty sets of line terminals in each level; but for simplicity in the diagram there are illustrated only two of the ten sets of brushes and a few of the line terminals in each level. This selector is adapted to select one out of ten groups of trunk lines, by the tripping of a corresponding set of brushes which traverse the level of line terminals comprising such group, and to test in rotation the lines of this group by advancing the tripped set of brushes along the terminals in the corresponding level, until a set of terminals is reached representing a trunk line which is idle, whereupon the selector brushes will come to rest upon such terminals, thus making connection with such trunk line. It will be understood that each trunk line is multipled to a number of selectors, so that any of such selectors will have access thereto. When connection is made with a trunk line by any selector a peculiar electrical condition (in the present case a ground-connection) is established at all the multiple test terminals of such line upon all the other selectors, which condition will prevent any of such other selectors from making connections to such line.

In accordance with the present invention, the local operating circuits of the selector are controlled by an auxiliary automatic switching mechanism which I term a sequence-switch. The preferred form of sequence-switch is illustrated in Figs. 2, 3, 4 and 5. In its elements, the sequence-switch comprises a movable switch-operating member, a motor magnet, mechanism operated or controlled by the motor magnet for moving the switch-operating member, and a plurality of switches actuated one after the other or in different combinations, by said movable member in its successive positions. As shown in the drawings, the movable member is a vertical rotary shaft 7 carrying a number of switch-operating cams 8, said shaft being arranged to be driven by power applied through the agency of an electromagnetic clutch. The constantly-driven power-shaft 11 carries a friction driving-disk 10 which by the action of a clutch-magnet 12 will be drawn into engagement with a friction roller 9, carried upon the shaft 7. The roller 9 and the disk 10 are of iron, and the motor magnet 12 is adapted when excited to magnetize said roller 9, which serves as a rotary pole piece for said magnet; whereby the driving disk 10 is attracted into engagement with said roller, the rotation of the shaft 7 thus continuing as long as the motor magnet 12 remains excited.

The cams 8 carried by the rotary shaft 7 are arranged to operate switch springs 13, forcing said springs into engagement with outer contacts 15, or allowing them to engage their alternate inner contacts 14, according to the positions of said cams. As many cams and switches may be provided as the particular apparatus to be controlled may require. Certain of the switch contacts operated in the successive positions of the movable switch element may control circuits for the motor-magnet 12. A special switch, such as shown in Fig. 5, is also preferably provided to control a local circuit for said motor magnet, whereby after the initial energizing circuit is broken by one of the other switches, the motor magnet may still be excited by current in the local circuit until the next intended stopping position of the rotary element is fully reached. As shown in Fig. 5, the cam 16 for operating the "local" switch is adapted to engage a roller 17 carried by a pivoted switch lever 18. A spring 19 is arranged to act upon said pivoted lever 18 so as to press the roller 17 against the edge of the cam 16. When the roller 17 rides upon a tooth or high part of the cam 16, said lever 18 closes a contact 20 which controls the local circuit for the motor magnet. The teeth of the cam 16 have inclined edges, so that the roller 17, after riding over the point of a tooth, is forced down the opposite slope by the action of the spring 19, and thus tends to push against the cam to continue the rotation thereof until the roller 17 reaches the bottom of the following notch. The rotary element is thus brought to rest accurately in each of the positions where it is intended to stop. In the operation of the device the circuit will first be closed for the motor-magnet through one of the springs 13 and one or the other of the contact anvils 14 or 15 of such spring. Then, as the motor-magnet is excited and the shaft of the sequence-switch begins to rotate, the contact through which the motor-magnet was initially excited may be broken, but the local circuit will be maintained for the motor-magnet through the contact 20 closed by the cam 16, and the rotary element will thus continue to advance until the cam roller 17 reaches the bottom of the next notch of the cam 16.

In the diagram, Fig. 1, the switch springs of the sequence-switch are not shown in their actual arrangement, but are so located as to give a clear arrangement of circuits; and the operating cams are not shown. The positions of the rotary element of each sequence-switch in which any of its contacts (except contact 20) are closed, are indicated by numbers placed adjacent to such contacts; each contact being open in all positions except those indicated by reference numbers. For example, contact 27 is closed in the first, second and third positions, as indicated by the numbers 1, 2, 3, placed adjacent thereto, and is open in all other positions. The alternate contact 46 is closed in the sixth position and open in all other positions. But the sequence-switch has a special contact 20 operated by cam 16 to close a local circuit for its motor magnet while the rotary element is in transit from one stopping position to the next. The numbers placed adjacent to this contact are on the opposite side of the switch lever from its contact anvil, and indicate positions in which the contact is open, the contact being closed continuously while the rotary element is in transit between the positions indicated. Thus, by reference to the numbers 1, 2, 3, 4, 5, 6, 8, 9, placed upon the opposite side of the switch lever 18 from its contact anvil 20, it will be understood that the contact is open in the first position, closed between the first and second, open in the second, and so on. It will be noted that after the rotary element leaves the sixth position, contact 20 is not opened until the eighth position is reached, so that the rotary element runs through from the sixth position to the eighth without a stop.

I have not illustrated in detail a "sending apparatus" for determining the selecting operation; but in order to illustrate the manner in which the selector may be controlled, I have diagrammatically indicated certain switches for making changes in the electrical condition of the main circuits at a distant point, such as would in fact be made by the controlling or sending apparatus.

The magnet 308 which is indicated as included in circuit with the main conductor 101 during the sending operation may be arranged to actuate a step-by-step mechanism (not shown) in response to impulses transmitted over the circuit 101. The magnet 309 may be arranged to open the circuit 101 after a predetermined number of impulses have been transmitted.

The operation is as follows: The contact 27 of the sequence-switch is normally closed, connecting the magnet of the selector-controlling relay 28 to the line conductor 101, which it is understood would be connected, for example, through a stepping relay 308 of a distant "sending apparatus," and through the back contact of a stop relay 309, also at the sending apparatus, to earth. When this circuit is closed at the sending apparatus, the selector-controlling relay 28 is excited, and closes at its front contact a circuit from the free pole of grounded battery 29, through resistance 30, motor magnet 12, contact 25 of the sequence-switch, and front contact of the relay 28, to earth. The motor magnet being thus excited, causes the sequence switch to advance to its second position, in which contact 25 is opened and contact 26 closed, whereby a circuit is completed from the battery 31 through the power-magnet 77 of the selector, contact 26 of the sequence-switch, and front contact of the test relay 28, to earth. The power magnet 77 being thus energized attracts the iron plate 73 into engagement with the driving roller 75, and the brush carrier of the selector begins to rotate. As the roller 85 of the interrupter rides over the toothed segment 88, the contact 86, 87, is alternately made and broken, and at each step a short circuit of the line is thereby completed through wire 33, back contact 34 of the trip-magnet 67, and contact 35 of the sequence-switch, through interrupter contact 86, 87, to earth, short circuiting the distant stepping magnet 308. Impulses are thus delivered to the stepping magnet 308 as the brush carrier of the selector rotates, and these impulses may be used to control the selecting operation. When the predetermined number of impulses have been transmitted, as measured by a corresponding movement of the step-by-step mechanism of the sender, actuated by magnet 308, the sending apparatus will cause the line circuit to be broken as by the action of relay 309. This occurs during a period of closure of the interrupter contacts 86, 87. The relay 28 at the selector will then be deënergized when the interrupter contact is next opened. As soon as the brush carrier of the selector begins to rotate, the cam 80 closes contact 81, 82, thereby completing a circuit from battery 29 through the motor magnet 12 of the sequence-switch, contact 36 of said switch, contact 82, 81, to earth. The motor magnet 12 being excited by current in this circuit, carries the sequence-switch to the 3rd position. In this position, as soon as the selector-controlling relay 28 is deënergized by the opening of the stepping circuit at the sender, said relay in closing its back contact completes a circuit for the motor magnet through contact 37 of the sequence-switch and back contact of the test relay to earth, carrying the sequence switch to the 4th position.

While the relay 28 was excited, the tripping magnet 67 of the selector was short-circuited by the path through the front contact of said relay. Upon the release of said selector-controlling relay, however, the short circuit of the tripping magnet is broken and said magnet is excited by current from battery 31, through power-magnet 77, tripping-magnet 67 and contact 38 of the sequence-switch, to earth. The power magnet 77 not being released, the brush carrier of the selector continues to rotate, and the first latch arm to reach one of the tripping lugs 66 will be engaged by such lug and detained sufficiently to release the three brushes normally held thereby, allowing these brushes to be rocked upon their pivots by their springs 54, 55, 56, and so pressed into contact with the grounded metal plate 70. The particular set of brushes which is thus brought into service will depend upon the number of steps through which the selector had advanced before the trip-magnet was excited. As soon as the test brush 53 of the selector touches the grounded metal plate 70, a circuit is completed for the controlling-relay 28 through contact 39 of the sequence-switch to the selector brush 53, and ground, and said relay is again excited, reëstablishing the short circuit of the trip-magnet, so that said trip-magnet is deënergized.

When the rotary element of the selector has advanced to a point at which all the brushes have been carried beyond the range of the tripping lugs, the cam 80 allows the spring 81 to return into contact with anvil 83. This completes a new circuit for the motor-magnet of the sequence-switch through contact 40 of said sequence-switch and contact 83, to earth. The sequence-switch is now moved to the 5th position, in which the selector will be caused to advance the tripped set of brushes over the contacts in its path, in a hunt for an idle set of terminals. When the sequence-switch left the 3rd position, contact 27 was opened, but in the 4th and 5th positions the relay 28 may still be excited by current from the battery 23 flowing through said relay 28 and contact 39 of the sequence-switch to the test brush 53 and thence to the grounded plate 70 or to the test terminals 63 of lines over which the selector may hunt, said terminals being grounded in case the line tested is busy. While the selector test brush is in transit from each terminal 63 to the next, the circuit 33 for the relay 28 is maintained through the interrupter contact 86, 87.

The sequence-switch in leaving the 4th position opens the contact 38 controlling the circuit for the trip magnet, leaving the power-magnet dependent for its excitation upon current in the circuit controlled at the front contact of the relay 28, which will now govern the further advance of the selector brushes in hunting an idle trunk.

The segment 88 of the selector is provided with a long tooth 89 to be engaged by the cam roller 85 of its interrupter while the brushes are passing between the end of the trip range and the beginning of the range containing the line terminals. As the brushes pass off the end of the grounded metal segment 70 the interrupter roller is passing over the long tooth 89, so that the short circuit 33 is closed and the relay 28 maintained excited. As the brushes reach the first set of line terminals, however, the roller 85 of the interrupter enters the first notch, and the interrupter contact 86, 87, is opened, breaking the short circuit 33 and leaving the relay 28 dependent for its excitation upon a circuit which may be completed through the third or test brush 53 of the set which has been tripped, to a test terminal which may be connected to earth. In the system with which the selector shown in the diagram is intended to be used, the test terminals of busy trunk lines are connected to earth, the test terminal of the line which is free having no earth connection. The circuit will, therefore, be maintained for the relay 28 of the hunting selector through the test brush 53 to earth as long as the test brush is passing over the terminals of busy lines. As the test brush reaches each terminal, the circuit for the relay 28 through the interrupter contact 86, 87, is broken; and as soon as the terminal of an idle trunk line is reached, there being no ground connection upon such test terminal, no circuit will exist for the relay 28, and its armature will be retracted, breaking the circuit of the power-magnet 77, and causing the selector brushes to come to rest upon the line so tested and found idle. The relay 28 in recovering closes a circuit for the motor magnet 12 of the sequence-switch through contact 37 of said switch, so that the switch is advanced to the 6th position. In the system under consideration, while a connection exists with the trunk line 101, 102, 103, at the distant point, the third conductor 103 of said trunk is grounded as indicated at 48. In the sixth position of the sequence-switch, a contact 22 is closed, which completes a path from resistance 30 through conductor 21 to earth 48 at the distant controlling point; this path being a short-circuit of motor-magnet 12. Although a circuit exists for the motor-magnet 12 of the sequence-switch in the sixth position by way of contact 37 and the back contact of the relay 28 to earth, said motor-magnet 12 will not be excited while the short-circuit 21 is completed at the distant point 48.

In the 6th position of the sequence-switch the contacts 46 and 47 are closed, completing the telephone transmission circuit, 101, 102, of the trunk line through to the terminals of the line which has been selected. The conductor 103, grounded at 48, is, in the sixth position of the sequence-switch, connected through contact 44 to the test brush 53 of the selector and so to the test terminal 63 upon which said brush rests; so establishing a "busy" test condition at all the multiple terminals of the line to which the selector has made connection.

The selector can be released and caused to return to normal by the removal of the ground connection from the wire 103 at the distant end of the trunk line. This will break the short circuit of the motor-magnet 12, and said magnet will be excited by current flowing in the circuit controlled at contact 37 of the sequence-switch, and back contact of the controlling relay. As the contact 20 controlling the local circuit for the motor-magnet 12 is not open in the 7th position, the sequence-switch will be carried through to the 8th position before stopping. In the 8th position a circuit will be closed for the power magnet 77 through contact 45 of the sequence-switch and back contact of the controlling relay. The selector being now displaced from its normal position, the surface of the iron plate 73 will be nearer to the return roller 74 than it is to the driving roller 75, so that when the power magnet 77 is excited the plate will be drawn into engagement with the return roller 74 and the rotary element of the selector will be carried back toward its normal position. When in this return movement the cam 80 forces the spring 81 into engagement with contact 82, a circuit is completed for the motor-magnet 12 of the sequence-switch through contact 36 of said switch and contact 82 closed by the cam, and the sequence-switch is moved to its 9th position. The circuit for the power-magnet is still closed in the 9th position, but as the rotary element of the selector finally reaches its normal position the cam 80 allows the spring 81 to engage its normal contact 83, completing a circuit for the motor magnet of the sequence-switch through contact 40 of said switch and contact 83 closed by the cam, whereby the sequence-switch is moved from its 9th position to its 1st or normal position. As the sequence switch leaves the 9th position, contact 45 is opened, breaking the circuit of the power-magnet 77 and so bringing the switch-carriage or rotary element of the selector to rest in its normal position.

Conductors 101, 102 and 103 may be the terminals of a trunk line leading to the selector, Fig. 1. It is therefore necessary to maintain a ground on conductor 103 to make it test busy until all the apparatus in the circuit has been returned to normal and the said trunk line is free to serve another connection. As previously stated, the removal of the ground 48 from conductor 103, when the sequence switch is in the 6th position, opens the short circuit for the motor magnet 12 whereupon the said motor magnet is energized through the circuit closed at contact 37. The sequence-switch is therefore advanced to its 7th position in which position contact 24 closes, grounding conductor 103. Contact 24 remains closed in positions 7, 8 and 9 of the sequence-switch, maintaining the trunk line in a busy condition until the said sequence switch is restored to normal.

The selector and its sequence-switch, when started in operation, thus progressively establish reciprocal local controlling circuits for their respective operating magnets, such that as each device completes a given stage of its operation, it brings into action local means for advancing the other device, until both devices are carried through a complete cycle of operations, terminating in the return of both devices to normal condition; the circuits for causing such cycle of operations being purely local, so that an accidental break in any of the main line circuits or other interference with the flow of current in such circuits, as a premature disconnection at the distant controlling point, will not result in the selector or its sequence-switch being permanently stalled in an off-normal position.

The extent of certain operations of the selector can be determined from the distant controlling point as described, and the cycle of operations checked at certain stages through the agency of devices controlled by a flow of current in the main line circuits, but if such flow of current is interfered with at any stage of the operation, the result will be to cause both devices to complete their cycle of operations and return to normal. For example, if the line circuit should be opened at the distant point as by a premature disconnection or a break in the circuit, immediately after the relay 28 is initially excited and when the sequence-switch has advanced no farther than the 2nd position, the cycle of operations will proceed as follows: A circuit will be completed from battery 31 through the power-magnet 77 and trip-magnet 67 in series, through contact 38 of the sequence-switch (closed in the 2nd position) to earth; and the brush carrier will be started in rotation. This circuit will be completed by the sequence-switch in its 2nd position, whether the relay 28 is excited or not; but as long as the relay 28 is excited it closes a short circuit of the trip-magnet and prevents the latter from acting.

If the controlling relay 28 is released, either by the intended action of the distant sending apparatus, or by a premature disconnection, a set of brushes is tripped, and the contact of the test brush with the grounded plate 70 closes a local circuit for said relay 28 which maintains the same excited and therefore causes the continued application of power to rotate the brush-carrier until the brushes pass beyond the trip range. The sequence-switch moves to the 3rd position when the brush carrier begins to rotate; as soon as the controlling relay is released, said sequence-switch moves to its 4th position, and when the brushes reach the end of the trip range, said sequence-switch moves to its 5th position.

After the sequence-switch leaves its 3rd position the contact 27 connecting the relay 28 to the line conductor is opened, leaving said relay dependent for its continued excitation upon the circuit through the test brush 53 of any set which may have been tripped, to the test terminals in the corresponding level, which are grounded if the corresponding lines are busy. If no brushes have been tripped, the brush-carrier will come to rest upon entering the range of line terminals, the relay 28 being released when the interrupter roller 85 passes off the end of the long tooth 89. The sequence-switch would then, upon the release of relay 28, be carried through to its 8th or return position, unless the motor magnet were short-circuited in the 6th position by ground 48 on the main conductor 103. If a set of brushes has been tripped, the selector will go through its hunting operation as before described. As soon as the tripped set of brushes reaches the terminals of an idle line, the relay 28 is released, and completes at its back contact a circuit for the motor magnet of the sequence-switch, whereby the latter now moves to the 6th position in which the main circuit 101, 102, is extended through to the selector brushes 51 and 52 and line terminals 61 and 62 upon which said brushes have come to rest. In this position, however, a local circuit is completed for the motor magnet of the sequence-switch through contact 37 and back contact of relay 28, which will result in the sequence-switch being advanced to its 8th position to close contact 45 and complete a circuit to again energize the power-magnet and cause the brush-carrier to return to normal. In the 6th position of the sequence-switch, however, contact 22 is closed, by which a short-circuit of the motor-magnet 12 is established, said short-circuit being completed by the dead ground connection 48 at the distant controlling point. When this ground connection is removed by disconnection at the distant end, or if the circuit should accidentally be broken, the motor-magnet 12 is immediately excited and advances the sequence-switch to its 8th position, in which the circuit for power magnet 77 is completed at contact 45, and the brush carrier thus returned to normal position as before described. The selector in its return movement closes contact 82 when the high part of the cam 80 reaches the cam roller of switch 81; whereby the sequence-switch is moved to its 9th position; and when the brush carrier reaches the normal position the cam 80 allows switch spring 81 to close against anvil 83, completing another circuit for the motor magnet 12, whereby the sequence-switch is carried on around to its first or normal position.

Both the selector and its sequence-switch are thus carried through a complete cycle of operations, terminating in the return of each to normal condition, by local reciprocal controlling circuits progressively established at successive stages in such cycle of operations, so that interference with the flow of current in the main circuits cannot cause the selector to be started in an off-normal position. The permanent displacement of a trunk-hunting selector in an off-normal position would cause serious inconvenience, not only because of the loss of its own service, but also because it might tie up the trunk line or lines upon which its brushes came to rest, thus seriously interfering with traffic throughout the system. My invention reduces the likelihood of such disorganization of the system by providing means for returning all the apparatus to normal through the agency of purely local operating or controlling circuits, when an abnormal condition exists in the main circuits such as to interfere with the usual order of operation.

It will also be observed that after the brushes have passed the trip range—that is, after the possibility of a normal selective operation under control from the distant point no longer exists, the controlling relay 28 is entirely disconnected from the main circuits, and the further operation of the selector is governed by purely local conditions. The apparatus cannot therefore be again taken for use or interfered with from the distant point until the complete cycle of operations has been concluded and all parts have fully returned to normal.

Certain details of construction of the sequence switch and selector which have been chosen to illustrate the invention described and claimed in this application I have illustrated and claimed in the following co-pending applications:—Serial No. 451,868, filed Sep. 5, 1908; Serial No. 503,049, filed Jun. 19, 1909; Serial No. 528,293, filed Nov. 16, 1909; Serial No. 530,499, filed Nov. 29, 1909; Serial No. 531,369, filed Dec. 4, 1909; Serial No. 573,516, filed Jul. 23, 1910.

I claim:

1. The combination with an automatic selector, of an automatic sequence-switch, and local reciprocal controlling circuits established in the operation of said selector and sequence-switch adapted to cause each of them to complete a cycle of operations and return to normal condition.

2. The combination with a plurality of electrical devices to be operated, of a controlling apparatus comprising a movable switch-element adapted to travel through a series of successive positions, operating circuits for the different electrical devices, switch contacts operated in sequence by the movable element in its successive positions, and adapted to bring into service the respective circuits for the different electrical devices, a motor magnet, mechanism brought into action thereby for advancing said movable element, a switch operated by each of said electrical devices, and a circuit for said motor magnet established in each position of the movable switch-element under the control of the particular device which was made operative in that position.

3. The combination with a controlling apparatus comprising a movable switch-element adapted to travel through a series of positions, of a constantly-acting source of motive power, a motor magnet and means controlled by said magnet for applying such motive power to drive said movable element, a series of different circuits established by said movable switch-element in its different positions, respectively, a device in each such circuit responsive to current therein, and a switch operated by each such device in its response, adapted to close a circuit for said motor magnet.

4. The combination with a controlling apparatus comprising a movable switch-element adapted to travel through a series of positions, of a constantly-acting source of motive power, a clutch magnet adapted to apply this motive power to said movable switch-element, means for initially exciting said clutch magnet, and a local circuit for said clutch magnet established through the agency of said movable switch-element during the travel thereof between each stopping position and the next intended stopping position.

5. In a switching appliance, the combination with a rotary shaft, of a series of cams mounted upon said shaft, a series of switch members adapted to be actuated by said cams respectively, a disk having notches in its periphery, the edges of said notches being inclined, a spring-actuated lever carrying a roller 17 adapted to ride upon the periphery of said notched disk and to enter said notches, an electromagnet, mechanism controlled thereby for rotating said shaft, circuits for initially exciting said electromagnet, controlled by switch members, a switch contact operated by said spring-actuated lever as said roller rides upon the periphery of said notched disk, and a local circuit for said electromagnet controlled by said contact.

6. A plurality of switches and devices arranged to operate the same in sequence, a constantly rotating shaft, a magnetic clutch adapted to cause said rotating shaft to move said switch-operating devices, electrical responsive devices and circuits therefor arranged to be established in sequence by said switches, and a circuit for the magnetic clutch closed in the operation of each of said responsive devices, to cause the switch-operating devices to be moved to their next positions.

7. The combination with a switching device having a magnet associated therewith and means controlled by said magnet when excited for moving said switching device, a local circuit for said magnet arranged to be closed by said switching device, and means at a distant point for maintaining a shunt or short-circuit of said magnet whereby the movement of said switching device may be checked.

8. The combination with an automatic selector having a movable switch carriage, of local operating means adapted when said carriage is started in motion to carry the same through a cycle of operations terminating in a return of the carriage to normal position, and means controlled from a distant point for determining the extent of movement of said carriage and arresting the same at an intermediate stage of the cycle.

9. The combination with an automatic selector, of an automatic sequence-switching device, means for initially operating said sequence-switching device to bring said selector into action, and local controlling circuits reciprocally established by said devices in their operation, adapted to cause both devices to be carried through a complete cycle of operations, terminating in the return of both to normal position.

10. The combination with a selector having a movable element, of a line relay, means controlled by said relay when excited for starting said element in motion, automatic means brought into service thereby for carrying said element through a further movement and returning the same to normal, and means controlled at a distant point for checking the operation of said automatic returning means.

11. The combination with an automatic selector, of an automatic sequence-switching device, means for initially operating one of said devices to bring the other into action, local reciprocal controlling circuits progressively established by said devices in their operation, adapted to cause both devices to be carried through a cycle of operations terminating in the return of both devices to normal, a relay, and means controlled by said relay for arresting and controlling such progressive operations.

12. The combination with an automatic selector, of a sequence-switching device comprising a motor magnet, and a plurality of switches adapted to be actuated in sequence by successive operations of said motor-magnet, said switches being arranged to control operating circuits for said selector, switching mechanism operated by the selector to control circuits for the motor-magnet of said sequence-switching device, means for initially exciting said motor-magnet, and local operating circuits automatically established by the switches of said sequence-switching device and said selector reciprocally for carrying them progressively through a complete cycle of operations terminating in the return of both to normal position.

13. The combination with an automatic selector having a movable switch element, of a relay, means controlled by said relay for starting the said movable element in operation, means made operative by said relay when released to determine the selective operation of said movable element, a line circuit for said relay, means for opening said circuit at a distant point to release said relay and thereby to determine such selective operation, means made operative by said relay when released adapted to return said movable element to normal position; and means at a distant point adapted to check the operation of said returning means.

14. A selector having operating magnets and a number of switch contacts actuated in a definite sequence at different stages in the operation of said selector, in combination with a sequence switch having a plurality of switch contacts, a motor-magnet and means made operative by said magnet for successively actuating said contacts, circuits for the operating magnets of the selector progressively established in the operation of the sequence-switch, means for controlling the magnet of said sequence-switch from a distant point, and local operating circuits for said motor-magnet established from time to time by the switch contacts which are progressively actuated by the selector.

15. The combination with a selector having brushes and line terminals traversed thereby, of a trunk line having conductors terminating in said brushes, a magnet 12 controlling said selector, a local circuit for said magnet, a short-circuit of said magnet through one of said conductors, and means for controlling said short-circuit at a distant point.

16. The combination with an automatic selector, of an automatic sequence-switch, reciprocal controlling circuits for said devices, progressively established in the operation thereof, said sequence-switch having a motor-magnet for operating the same, and a short-circuit for said motor-magnet controlled at a distant point.

17. The combination with an automatic selector, of an automatic sequence-switch having a motor magnet for operating the same, reciprocal local controlling circuits established progressively by said sequence-switch and selector, adapted to cause a complete cycle of operations thereof terminating in the return of both devices to normal, distant means for initially starting one of said devices in operation, and a short-circuit of said motor-magnet controlled at a distant point, whereby the progressive operation of the sequence-switch and associated selector may be arrested by the maintenance of such short-circuit.

18. The combination with a selector having a movable brush-carrier equipped with multiple sets of brushes, each set including a test brush, of a controlling relay, means made operative by said relay while excited for moving said brush-carrier, a magnet 67 and means made operative thereby for bringing into service one of said sets of brushes, according to the position of said carrier when said magnet is excited, a circuit for said relay and means for opening the same after a predetermined period of closure to release said relay, means made operative by the release of said relay for exciting said magnet, a conductor connecting said relay with the test brushes of the selector, a terminal 70 adapted to be engaged by the selected test brush during an arc of travel of the brush carrier sufficient to allow any set of brushes to be brought into service, a local circuit for said relay, completed by said test brush and said terminal 70, trunk lines and sets of terminals therefor each including a test-terminal, said test terminals being arranged to be engaged by the test brushes of the selector in a further advance thereof, and means made operative in the use of any trunk line for establishing a path from the test terminal thereof adapted to complete a circuit for said relay through the test brush engaging such terminal.

19. The combination with a sequence switch and a relay, of a motor magnet for said sequence switch, a local circuit for said motor magnet, controlled by said relay, said local circuit having alternate paths through contacts closed in successive positions of said sequence switch and leading respectively to alternate contacts of said relay.

20. The combination with a sequence switch and a relay, of a motor magnet for said sequence switch and a local circuit for said motor magnet, said local circuit in one position of the sequence switch leading through a contact thereof to an open contact of said relay, and in a succeeding position of said sequence switch through another contact thereof to an alternate contact of said relay.

In witness whereof, I hereunto subscribe my name this first day of September A. D., 1908.

FRANK R. McBERTY.

Witnesses:
D. C. TANNER,
A. H. MOORE.

Copies of this patent may be obtained for five cents each, by addressing the "Commissioner of Patents, Washington, D. C."